United States Patent
Nam et al.

(10) Patent No.: US 7,697,108 B2
(45) Date of Patent: *Apr. 13, 2010

(54) METHOD OF REPAIRING FLAT PANEL DISPLAY DEVICE

(75) Inventors: Seung-Hee Nam, Suwon-si (KR); Oh-Nam Kwon, Yongin-si (KR)

(73) Assignee: LG Display Co., Ltd., Seoul (KR)

( * ) Notice: Subject to any disclaimer, the term of this patent is extended or adjusted under 35 U.S.C. 154(b) by 915 days.

This patent is subject to a terminal disclaimer.

(21) Appl. No.: 11/448,112

(22) Filed: Jun. 7, 2006

(65) Prior Publication Data
US 2007/0139607 A1  Jun. 21, 2007

(30) Foreign Application Priority Data
Dec. 20, 2005 (KR) .................. 10-2005-0126244

(51) Int. Cl.
*G02F 1/13* (2006.01)
*G02F 1/1333* (2006.01)

(52) U.S. Cl. ........................................ 349/192; 349/54
(58) Field of Classification Search ............ 349/54–55, 349/192
See application file for complete search history.

(56) References Cited

U.S. PATENT DOCUMENTS 6,894,737 B2 * 5/2005 Bae .............................. 349/43
7,548,286 B2 * 6/2009 Yoo et al. ...................... 349/54

FOREIGN PATENT DOCUMENTS

JP 2005-189360 7/2005

* cited by examiner

*Primary Examiner*—Dung T. Nguyen
(74) *Attorney, Agent, or Firm*—McKenna Long & Aldridge

(57) ABSTRACT

A method of repairing a flat panel display device including first and second substrates and at least one particle on one of the first and second substrates includes forming at least one recess on the other of the first and second substrate corresponding to the at least one particle, filling the at least recess with resin, and irradiating polarized ultraviolet light to the resin.

13 Claims, 3 Drawing Sheets

METHOD OF REPAIRING FLAT PANEL DISPLAY DEVICE

The present invention claims the benefit of Korean Patent Application No. 2005-0126244, filed on Dec. 20, 2005, which is hereby incorporated by reference for all purposes as if fully set forth herein.

BACKGROUND OF THE INVENTION

1. Field of the Invention

The present invention relates to a method of repairing a flat panel display device, and more particularly, to a method of solving problems in images displayed on a liquid crystal display device.

2. Discussion of the Related Art

A flat panel liquid crystal display (LCD) device is widely used because of its light weight, thin profile, large screen size, fine screen pitch, and low power consumption as compared to a cathode ray tube (CRT).

The LCD device includes upper and lower substrates and a liquid crystal layer interposed therebetween. On the lower substrate, thin film transistors for driving pixels are formed. A pixel electrode is formed in each pixel. On the upper substrate, a common electrode is formed. The upper and lower substrates may include glass or quartz. To prevent an electrical short between the pixel and common electrodes, an insulating layer may be formed on the pixel electrodes or the common electrode. Alignment layers are formed on the pixel electrodes and the common electrode and are rubbed so that liquid crystal molecules of the liquid crystal layer are arranged in a predetermined direction. A seal pattern is formed in a peripheral area of the display between the upper and lower substrates to form a cell gap and to prevent leakage of the liquid crystal layer.

FIG. 1 is a schematic view of an LCD device according to the related art. In FIG. 1, an upper substrate 1 and a lower substrate 2 are spaced apart from and face each other. A color filter layer 3 and a common electrode (not shown) are formed on an inner surface of the upper substrate 1. Although not shown in the figure, thin film transistors and pixel electrodes are formed on an inner surface of the lower substrate 2. A first alignment layer 4 is formed on the color filter layer 3, and a second alignment layer 5 is formed on the inner surface of the lower substrate 2. A liquid crystal layer 6 is interposed between the first and second alignment layers 4 and 5.

A particle 8 may be formed on either the first alignment layer 4 or the second alignment layer 5. A liquid crystal material may be injected between the first and second alignment layers 4 and 5 with the particle 8, and thus the liquid crystal layer may be formed. In an LCD device with a normally black mode, when a voltage is not applied, a bright spot or a weak spot is observed on a panel of the LCD device due to the particle 8 as shown in FIG. 2. This is caused by distortion of the liquid crystal molecules due to the particle 8 on the alignment layer 4 and occurs even when a voltage is applied and thereby lowers image qualities of the LCD device.

SUMMARY OF THE INVENTION

Accordingly, the present invention is directed to a method of repairing a flat panel display device that substantially obviates one or more of the problems due to limitations and disadvantages of the related art.

An advantage of the present invention is to provide a method of repairing a flat panel display device that repairs spots on images of the display device without damage of the display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of repairing a flat panel display device including first and second substrates and at least one particle on one of the first and second substrates includes forming at least one recess on one of the first and second substrate in a position corresponding to the at least one particle, filling the at least recess with resin, and irradiating the resin with polarized ultraviolet light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the preferred embodiment of the present invention, an example of which is illustrated in the accompanying drawings.

Figure 1:
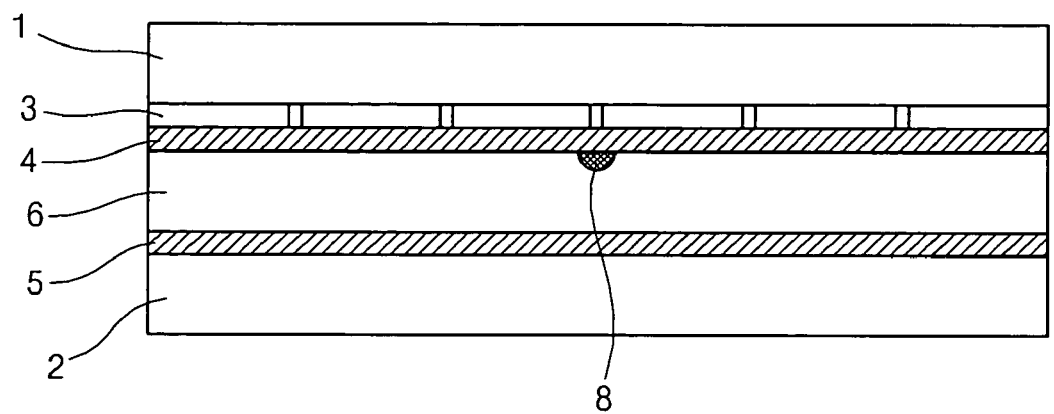
FIG. 1 is a schematic view of an LCD device according to the related art.
Figure 2:
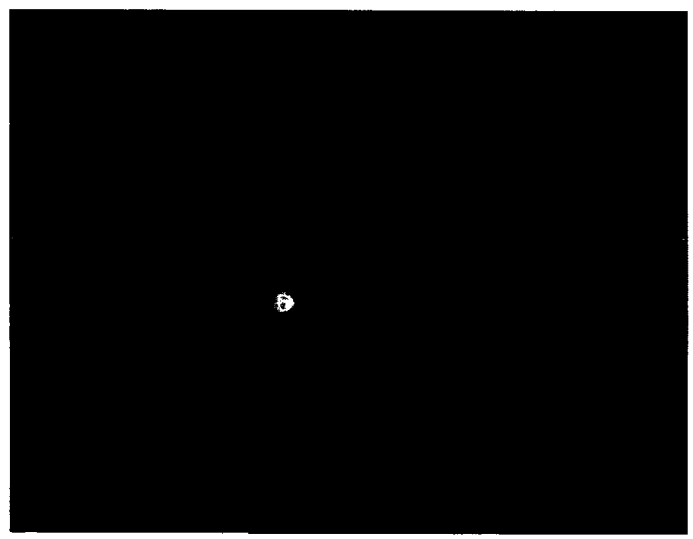
FIG. 2 is a view illustrating a black image of an LCD device according to the related art.
Figure 3A:
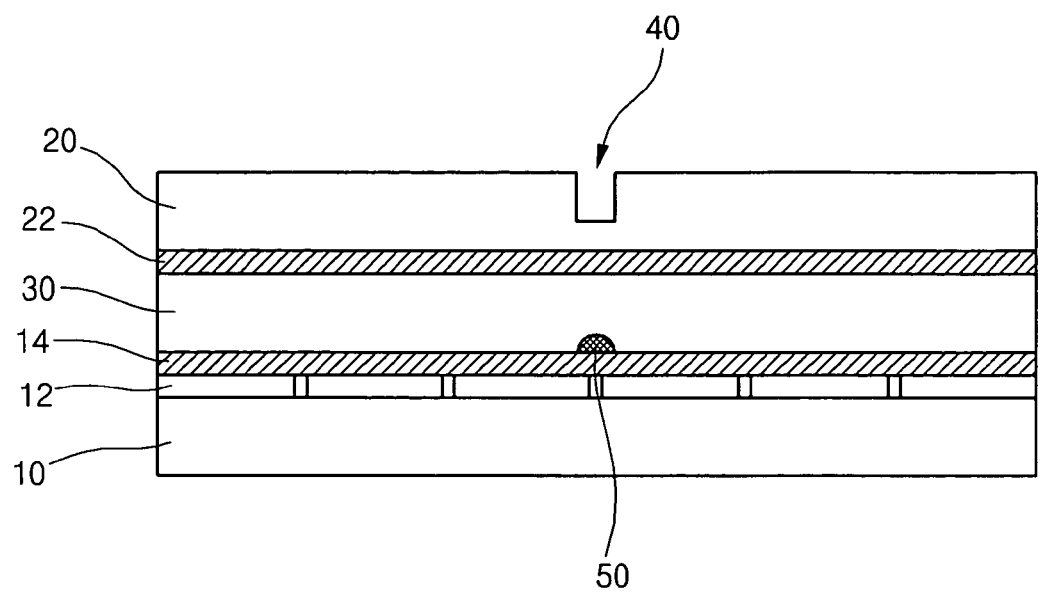
FIGS. 3A to 3C are schematic cross-sectional views illustrating a method for repairing an LCD device according to an embodiment of the present invention.
Figure 3B:
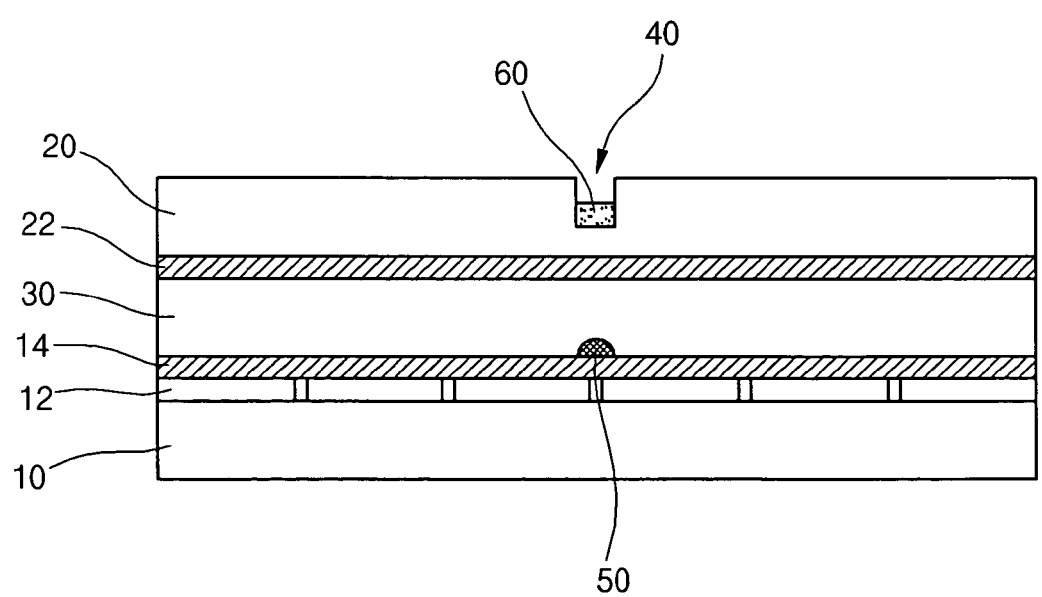
Figure 3C:
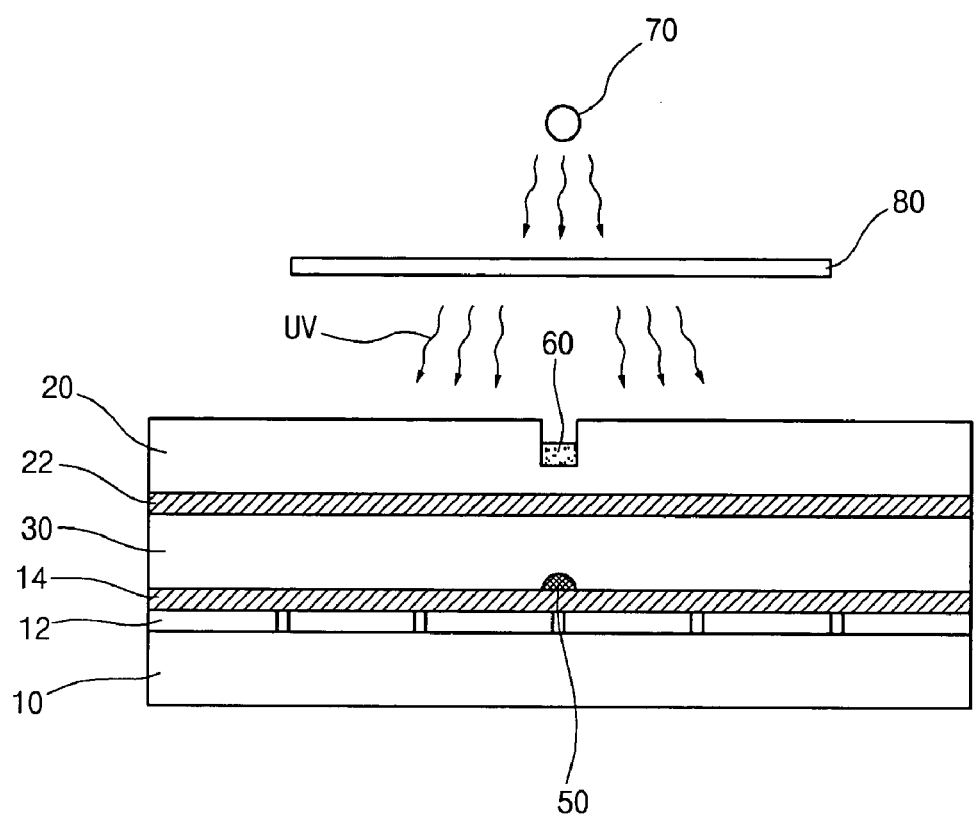

FIGS. 3A to 3C are schematic cross-sectional views illustrating a method for repairing an LCD device according to an embodiment of the present invention.

As illustrated in FIG. 3A, a first substrate 10 and a second substrate 20 are spaced apart from and face each other. A color filter layer 12 is formed on an inner surface of the first substrate 10. A first alignment layer 14 is formed on the color filter layer 12. A second alignment layer 22 is formed on an inner surface of the second substrate 20. A liquid crystal layer 30 is interposed between the first and second alignment layers 14 and 22. A particle 50 may be formed on the first alignment layer 14, or the particle 50 may be formed on the second alignment layer 22.

Although not shown in the figure, a common electrode is formed between the color filter layer 12 and the first alignment layer 14, and thin film transistors and pixel electrodes are formed between the second substrate 20 and the second alignment layer 22.

After an LCD device has been manufactured it may be inspected. First, the LCD device is driven so that all of the pixels are turned on. Next, an auto probe is scanned across the LCD device to detect any stains, dot defects, line defect, or any other defect. If any defects are identified, then the LCD device is repaired.

In a first step of repairing the LCD device, a recess 40 is formed on an outer surface of the second substrate 20 (that is, a substrate opposite to the particle 50) with a position corresponding to the particle 50. The recess 40 has a predetermined depth from the outer surface of the second substrate 20 along a direction perpendicular to the second substrate 20 and does not reach the inner surface of the second substrate 20.

The recess may be formed, for example by, micro drilling, micro end milling, by use of a short wavelength laser, or using ultrasound. The size of the recess may be tailored to the size of the defect, in which case a minimum amount of the display is blocked, or a single recess size may be used to will encompass the defects to be repaired, in which the efficiency of the repair process is improved. The size of the defect may be a whole pixel or any portion thereof.

Next, as shown in FIG. 3B, the recess 40 is filled with resin 60 using a micro nozzle (not shown). The resin 60 may have a dark color to block a bright spot caused by the particle 50 on an image of a display panel, and the resin 60, may be formed of dark-colored resin for example a black-colored resin. The recess 40 may be filled with enough of the resin 60 so as to not transmit light from a backlight unit. The resin 60 may have a volume of more than 10% of a volume of the recess 40.

As shown in FIG. 3C, ultraviolet (UV) light from a UV light source 70 is irradiated to the resin 60 through a polarizing filter 80 to harden or cure the resin 60. A component of the UV light, which oscillates in a predetermined direction, is intercepted by the polarizing filter 80, and thus polarized UV light reaches the resin 60. The intercepted component of the UV light is parallel to an aligning direction of the alignment layer on the substrate with the recess. If this component of the UV light is not intercepted, this component of the UV light may destroy bonds between molecules of the liquid crystal and the alignment layer on the substrate with the recess and also may damage the alignment layer. The component of the UV light that is not parallel to the aligning direction of the alignment layer does not destroy the alignment capability of the alignment layer. Because the component of the UV light that is parallel to the aligning direction of the layer may cause damage to the alignment layer, it is desirable to control a size of the polarizing filter 80 and a distance between the polarizing filter 80 and the UV light source 70 such that unpolarized UV light is not directly irradiated on to the first and second alignment layers 14 and 22.

The recess may be formed on either substrate to repair the LCD device, so that the recess may be on the same substrate or the opposite substrate from where the particle is present.

In the present invention, display problems such as spots can be repaired by simple equipment. By using polarized UV light, damage to the alignment layers are minimized, and a flat panel display device having desirable characteristics may be provided.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of repairing a flat panel display device including first and second substrates, first and second alignment layers on inner surfaces of the first and second substrates, respectively, and at least one particle on a surface of one of the first and second alignment layers, comprising:

forming at least one recess on one of the first and second substrate in a position corresponding to the at least one particle;

filling the at least one recess with a black-colored UV curable resin; and irradiating the black-colored UV curable resin with polarized ultraviolet light, wherein the polarized ultraviolet light includes a component perpendicular to aligning directions of the first and second the alignment layers and excludes a component parallel to the aligning directions of the first and second alignment layers.

2. The method according to claim 1, wherein the at least one recess has a predetermined depth from and contacts an outer surface of the one of the first and second substrates along a direction perpendicular to the first and second substrates and is spaced apart from an inner surface of the one of the first and second substrate.

3. The method according to claim 1, wherein irradiating the black-colored UV curable resin with polarized ultraviolet light includes:

disposing a ultraviolet light source over the flat panel display device;

disposing a polarizing filter over the flat panel display device; and irradiating ultraviolet light from the ultraviolet light source to the black-colored UV curable resin through the polarizing filter, wherein the polarizing filter is between the flat panel display device and the ultraviolet light source.

4. The method according to claim 3, wherein the polarizing filter blocks a polarization component of the ultraviolet light parallel to the aligning direction of the alignment layer on the substrate with the at least one recess and transmits a polarization component of the ultraviolet light perpendicular to the aligning direction of the alignment layer on the substrate with the at least one recess.

5. The method according to claim 1, wherein the flat panel display device further includes a liquid crystal layer between the alignment layers.

6. The method according to claim 1, wherein the resin has a volume more than 10% of a volume of the at least one recess.

7. The method according to claim 1, wherein forming the at least one recess includes one of micro drilling, micro end milling, using a short wavelength laser, and using unltrasound.

8. The method according to claim 1, wherein the at least one recess is recesses all having the same size.

9. The method according to claim 1, wherein a size of the at least one recess is formed according to a size of the at least one particle.

10. A repaired liquid crystal display device, comprising;

a first and second substrate;

a first and second alignment layer on inner surfaces of the first and second substrates, respectively;

a liquid crystal disposed between the first and second substrates;

a particle on a surface of one of the first and second substrates;

a recess on a surface of one of the first and second substrates corresponding to the particle; and a black-colored UV cured resin filling the recess, wherein the black-colored UV cured resin is cured with UV light that is polarized, includes a polarization component perpendicular to aligning directions of the first and second alignment layers and excludes a polarization component parallel to the aligning directions of the first and second alignment layers.

11. The device of claim 10, wherein the device is a normally black mode device.

12. The device of claim 10, wherein the recess has a predetermined depth from and contacts an outer surface of the one of the first and second substrates along a direction perpendicular to the first and second substrates and is spaced apart from an inner surface of the one of the first and second substrate.

13. The device according to claim 10, wherein the resin has a volume more than 10% of a volume of the at least one recess.

* * * * *